Aug. 26, 1924.
M. B. CUTSHAW
CALCULATOR
Filed Oct. 3, 1922
1,506,112
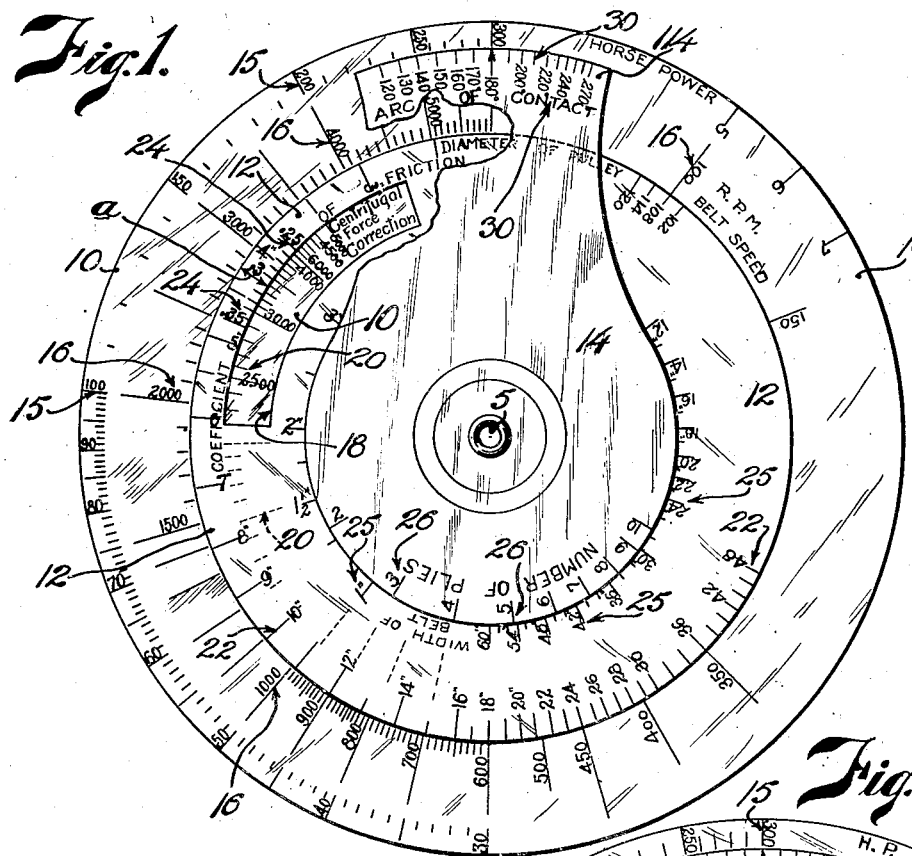
Fig. 1.
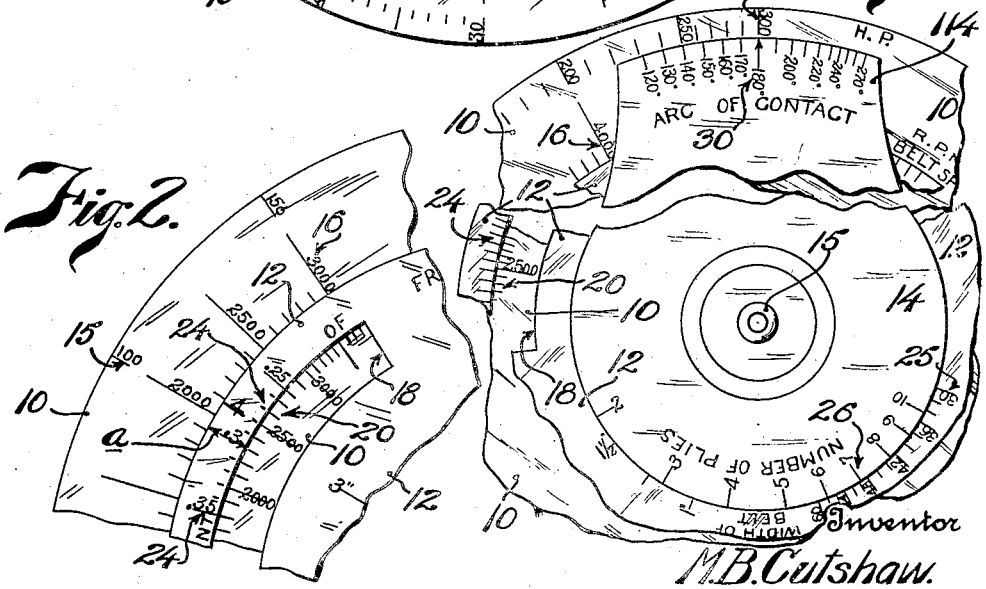
Fig. 2.  Fig. 2ᵃ.
Inventor
M. B. Cutshaw.
By Lynn L. Steele
Attorney.

Patented Aug. 26, 1924.

1,506,112

UNITED STATES PATENT OFFICE.

MURVIN B. CUTSHAW, OF DENVER, COLORADO.

CALCULATOR.

Application filed October 3, 1922. Serial No. 592,009.

*To all whom it may concern:*

Be it known that I, MURVIN B. CUTSHAW, a citizen of the United States, and resident of the city and county of Denver, State of Colorado, have invented certain new and useful Improvements in Calculators; and I do declare the following to be a full, clear, and exact description of the invention, such as will enable others skilled in the art to which it appertains to make and use the same, reference being had to the accompanying drawings, which form a part of this specification.

The object of this invention is to provide a calculator or computing scale of the circular slide rule type for the determination of power transmission requirements where flexible belts are employed, whereby all variable factors may be taken into account and accurate results obtained.

One of the chief features of the invention is the provision of a correction scale for the coefficient of friction whereby the theoretical reading may be adjusted to give the actual figures. Another feature resides in the use of a single scale wherein the revolutions per minute (R. P. M.) of the pulley and the belt speed factors are combined, so that a single scale serves for both. In conjunction with this combined scale, a second belt speed scale is used which is corrected for centrifugal force to give actual instead of theoretical results. By means of other scales, including a scale for diameter of pulley, the conditions of horse power, width of belt, number of plies of belt and arc of contact of belt with pulley may be determined for belting of given strength per unit.

In the accompanying drawings wherein one form of calculator is shown by way of ilustration, Fig. 1 is a plan thereof with the parts in operative position;

Fig. 2 is a plan of portions of the device of Fig. 1 set for correction for centrifugal force and for coefficient of friction;

Fig. 2ª is a similar fragmentary plan of other portions of the device set for taking final readings after the adjustment of Fig. 2 has been made.

The form of calculator shown in the drawings comprises a base or master disc 10, a smaller disc 12 mounted thereon, and a partially circular plate 14 formed on a smaller circle and provided with an extension or projecting finger 114 for cooperation with the disc 10. The discs 10 and 12 and the plate 14 are pivoted on a common center 5 for adjustment of the various scales during computing operations.

The disc 10 is provided with a scale 15 representing horse power values, a scale 16 combining therein both revolutions per minute (R. P. M.) and belt speed values, and a scale 20 viewed through an opening 18 in the second disc 12. Scale 20 represents equivalent belt speed values after correction for centrifugal force, this correction being required because of an increase in tension on the belt due to centrifugal force which decreases the available tension for power transmission, this decrease being considerable at high speeds. Inasmuch as correction is required for the coefficient of friction in order to give correct figures for actual practice, the disc 12 is provided with a short scale 24 alongside view opening 18 for the purpose of making correction on the scale 20 for this factor and thereby properly adjusting the disc 12 with respect to disc 10. Disc 12 also carries scale 22 which represents the pulley diameters and cooperates with scale 16 for obtaining the actual or primary belt speeds which are read off on scale 16 opposite the fixed point indicated by the double arrow *a* at the side of opening 18. In addition, disc 12 carries a scale 25 representing width of belt values for cooperation with a scale 26 on plate 14 which scale 26 indicates the number of plies of the belt. Plate 14 has on the outer edge of finger 114 a scale 30 representing values for the arcs of contact of the belt with the pulley, this scale being adapted for adjustment with respect to the horse power scale 15 on disc 10.

In using the calculator to determine for instance the size of belt to be used under given conditions, the given diameter of pulley on scale 22 is set on the given number of revolutions per minute of the pulley where found in scale 16, and the resulting actual belt speed is read off on scale 16 opposite arrow *a* on disc 12. Thus, as shown in Fig. 1, if the pulley diameter is 18 inches and the R. P. M. thereof is 600, or if the pulley diameter is 12 inches and the R. P. M. is 900, the belt speed found opposite arrow *a* is about 2800. To make correction for centrifugal force, the other end of arrow *a* is set at about 2800 on scale 20 as viewed through opening 18, so that the corresponding reading may be taken at the opposite point on scale 16, which would make the equivalent belt speed reading, covering the correction for centrifugal force, a little less than 2500.

However the actual taking of this last reading ordinarily is not necessary, and instead the correction for the coefficient of friction is made at the same time by setting the known coefficient of friction value of scale 24 at 2800 on scale 20. In this particular problem, it happens that if the coefficient of friction be slightly over 0.35, or 0.36, no adjustment would be required since 0.36 of the coefficient of friction scale lies opposite 2800 of scale 20, the coefficient of friction correction in this instance being automatically made without movement; however this usually is not possible. The scales on disc 12 are now properly set with relation to the scales on disc 10 so that when arc of contact scale 30 is set on scale 15 for the required horse power the necessary width of belt for any desired number of plies of belt may be read off on scale 25. For instance, for a given strength of belt per unit, which for the present scale is 20 pounds per ply per inch of width, if the arc of contact of belt with pulley is to be 180° and the required horse power is to be 300 (or if 140° and 250 H. P.), the readings at the scales 25 and 26 would require a 30 inch belt of nine plies, or a 46 inch belt of 6 plies.

However, if in the above problem the coefficient of friction be 0.25 instead of 0.36, the 0.25 reading of scale 24 would be moved opposite the 2800 reading of scale 20 on disc 10 as indicated in Fig. 2. Thus when the 180° reading of arc of contact scale 30 is set at 300 H. P. on scale 15, and the 0.25 coefficient of friction reading is brought opposite 2800 of the corrected belt speed scale, the width of belt scale 25 is moved with respect to the number of plies scale 26, so as to indicate a greater belt width for a given number of plies as shown in Fig. 2ª which shows the relation of the scales when adjusted for the coefficient of friction adjustment 0.25 of Fig. 2. Thus a 9 ply belt would now have to be 38 inches wide and a 6 ply belt would have to be 58 inches wide.

Obviously, the calculator can also be used to determine the amount of horse power capable of being transmitted with a given arc of contact or some other permissible arc of contact, when the number of plies and the width of the belt are predetermined.

Thus the present scale makes it possible to correct for centrifugal force and for the coefficient of friction, and also the number of scales is reduced by combining the R. P. M. scale and the primary belt speed scale.

As a result, the present scale makes it possible to solve accurately the following belt-transmission formula, which has not heretofore been possible with any mechanical calculator of this type:

$$H. P. = \frac{W \times N \times S \times F}{33000 \times C}$$

where W is the width of the belt, N the number of plies, S the speed of the belt, F pounds pull of the belt per inch per ply corrected for centrifugal force, and C is a constant determined by the arc of contact and the coefficient of friction between the belt and the pulley.

I claim:

1. In a belt calculator, a member having a combined scale for revolutions per minute and belt speed and also having a scale correcting belt speed for centrifugal force, and a second member having a diameter of pulleys scale cooperating with the other scales for giving belt speeds.

2. In a belt calculator, a member having a scale combining revolutions per minute and belt speed and a scale correcting belt speed for centrifugal force, and a second member having a diameter of pulleys scale to cooperate with the other scales for determination of belt speeds, the second member having a second scale for correction for coefficients of friction movable to bring desired coefficient of friction values opposite predetermined corrected centrifugal force values.

3. In a belt calculator, a member having a combined scale for revolutions per minute and the actual belt speed and a belt speed scale correcting for centrifugal force, a second member having a diameter of pulleys scale for cooperation with the first mentioned scales for determination of belt speed, the second member also having a scale for correction for coefficients of friction, and a third scale-bearing member with respect to which the scales of the second member, when the latter is adjusted for coefficient of friction correction, are properly positioned for accurate determination of conditions of belt, horse power and arc of contact of belt with pulley.

4. In a belt calculator, a member having a belt speed scale, a second member having a diameter of pulleys scale for cooperation with the first member to determine belt speed, the second member also having a scale for correction for coefficient of friction, and a third member, the various members bearing other scales for determination of conditions of belt requirements, horse power and arc of contact of belt with pulley, the scales of the second member being properly positioned with respect to the scales of the third member for accurate determination of values when the second member is adjusted for correction of coefficient of friction.

5. In a calculator, a member having a belt speed scale and a correction scale for centrifugal force, a second member having a window for viewing the correction scale and adapted to be set relatively thereto and having also a belt factor scale, and a third member having a belt factor scale and adjustable with respect to scales of the other members for accurate reading of belt conditions.

6. In a belt calculator, a member having a belt speed scale and a correction scale for belt influencing factors, a second member having a belt factor scale and a window for viewing said correction scale and adapted to be adjusted relatively thereto, and a third member having a belt factor scale and cooperating with scales of the other members for accurate determination of belt conditions.

7. A belt calculator having a single scale for revolutions per minute of a pulley and the actual belt speed, a belt speed scale corrected for centrifugal force, a scale for correction for coefficient of friction adapted to be set relatively thereto, and scales for horse power and belt factors whereby accurate readings may be taken.

8. A belt calculator having scales for belt speed corrected for centrifugal force, horse power, belt factors and coefficient of friction and arc of contact corrections, whereby the following formula may be solved, $$H. P. = \frac{W \times N \times S \times F}{33000 \times C}$$

where W is the width of the belt, N the number of plies of the belt, S the speed of the belt, F pounds pull of the belt per inch per ply corrected for centrifugal force, and C is a constant determined by the arc of contact and the coefficient of friction.

In testimony whereof I affix my signature.

MURVIN B. CUTSHAW.